United States Patent [19]

Lovera et al.

[11] 4,342,540
[45] Aug. 3, 1982

[54] ARTICULATED ROTOR FOR HELICOPTERS

[75] Inventors: Bruno Lovera, Cardano; Santino Pancotti, Gallarate; Emilio Pariani, Cardano; Giuseppe Virtuani, Milan, all of Italy

[73] Assignee: Costruzioni Aereonautiche Giovanni Agusta S.p.A., Italy

[21] Appl. No.: 113,726

[22] Filed: Jan. 21, 1980

[30] Foreign Application Priority Data

Feb. 2, 1979 [IT] Italy .................. 67223 A/79

[51] Int. Cl.³ .......................................... B64C 27/38
[52] U.S. Cl. .................................... 416/140; 416/107; 416/141
[58] Field of Search ............... 416/106, 107, 140, 141, 416/134 A

[56] References Cited

U.S. PATENT DOCUMENTS

| | | | |
|---|---|---|---|
| 3,147,810 | 9/1964 | Mosinskis | 416/140 A |
| 3,282,350 | 11/1966 | Kisovec | 416/140 A X |
| 3,762,834 | 10/1973 | Bourquardez | 416/140 A |
| 3,932,059 | 1/1976 | Rybicki | 416/140 A |
| 3,967,918 | 7/1976 | Mouille et al. | 416/134 A X |
| 4,012,169 | 3/1977 | Mouille et at. | 416/134 A |
| 4,105,365 | 8/1978 | Ferris et al. | 416/107 |
| 4,178,130 | 12/1979 | Ferris et al. | 416/107 |
| 4,203,708 | 5/1980 | Rybicki | 416/140 A X |
| 4,235,570 | 11/1980 | Ferris et al. | 416/140 A |
| 4,257,739 | 3/1981 | Covington et al. | 416/134 A |
| 4,304,525 | 12/1981 | Mouille | 416/141 |

FOREIGN PATENT DOCUMENTS

| | | | |
|---|---|---|---|
| 52-64797 | 5/1977 | Japan | 416/141 |
| 212105 | 2/1941 | Switzerland | 416/107 |
| 2041310 | 9/1980 | United Kingdom | 416/134 A |

Primary Examiner—Everette A. Powell, Jr.
Attorney, Agent, or Firm—Kane, Dalsimer, Kane, Sullivan and Kurucz

[57] ABSTRACT

The multi-blade articulated rotor for helicopters, comprises a hub connected to a shaft rotatable substantially about a vertical axis, the hub being in the form of a plate comprising a plurality of perforations, each of which defines a bridge of material of said plate between a part of the edge of said perforation and a part of the edge of said plate; a plurality of yokes, each of which is substantially of U shape and comprises a pair of substantially parallel arms and a base element which connects together one end of said arms, the other end of the arms being connected to one of said blades, said base element being inserted into one of said perforations in the hub; a plurality of elastomer bearings, each of which is disposed between said base element of a yoke and the corresponding hub bridge; and means for limiting the amplitude of the swivel movement which each of said yokes can make substantially in a vertical plane.

2 Claims, 2 Drawing Figures

ARTICULATED ROTOR FOR HELICOPTERS

BACKGROUND OF THE INVENTION

This invention relates to an articulated rotor for helicopters, in which the basic blade movements can be effected substantially exactly, and which at the same time is of considerable constructional simplicity.

Each blade of a rotor of this type is connected to its hub in such a manner as to allow it the freedom to swivel substantially about three fundamental axes. A first swivel movement takes place about a substantially horizontal axis to enable the blade to move in a vertical plane (variation of the flapping angle); a second swivel movement takes place about a vertical axis to enable the blade to move in a substantially horizontal plane (variation of the lead-lag angle); and finally a third swivel movement takes place about an axis coinciding with the longitudinal axis of the blade (variation of the pitch angle).

Various types of articulated rotor for helicopters are known in which each blade is connected to the hub by means of a kinematic linkage arranged to transmit to the hub the centrifugal force applied to each blade, but which allows each blade sufficient degrees of freedom to enable it to swivel about the three said axes. Such a kinematic linkage normally uses a number of rigid and/or deformable members connected variously together in such a manner as to give rise to rigid and resilient connections between the blade and hub. In particular, elastomer bearings are widely used as the deformable members in such a kinematic linkage.

However, rotors of the described type have the drawback of being considerably complicated because of the structure of said kinematic linkage, and if elastomer elements are used instead of rigid members for simplicity reasons, then such rotors have the drawback of not effecting the aforesaid three swivel movements in an exact manner from the kinematic viewpoint. Thus summarising, in constructions in which said kinematic linkage uses only rigid members (levers, frames, hinges, bearings and the like), rotors are obtained which are very complicated, heavy and costly; however if this structure is simplified by using deformable elements of elastomer material, the kinematic purity of the articulation between the blade and hub is impaired, such that certain movements do not become properly defined or undesirable constraints become introduced.

SUMMARY OF THE INVENTION

The object of the present invention is to provide an articulated rotor for helicopters, which although of very simple structure enables the three aforesaid basic movements to be exactly effected.

The rotor according to the invention is characterised by comprising:

- a hub connected to a shaft rotatable substantially about a vertical axis, the hub being in the form of a plate comprising a plurality of perforations, each of which defines a bridge of said plate material between a part of the edge of said perforation and a part of the edge of said plate;
- a plurality of yokes, each of which is substantially of U shape and comprises a pair of substantially parallel arms and a base element which connects together one end of said arms, the other end of the arms being connected to one of said blades, said base element being inserted into one of said perforations in the hub in such a manner that the corresponding bridge is disposed between said yoke arms and the longitudinal axis of the yoke is orientated substantially in a radial direction to the hub;
- a plurality of elastomer bearings, each of which is disposed between said base element of a yoke and the corresponding hub bridge, and is bounded by a pair of coaxial spherical surfaces to form a spherical hinge which resiliently connects the yoke to the hub and of which the centre conicides with the centre of said spherical surfaces;
- means for limiting the amplitude of the swivel movement which each of said yokes can make substantially in a vertical plane about an axis passing through the centre of said spherical hinge, in order to limit the flapping angle of the relative blade in accordance with the rotational speed of the rotor.

BREIF DESCRIPTION OF THE DRAWINGS

The present invention will be more apparent from the description given hereinafter of one embodiment thereof, with reference to the accompanying drawings in which.

DETAILED DESCRIPTION OF THE INVENTION

Figure 2:
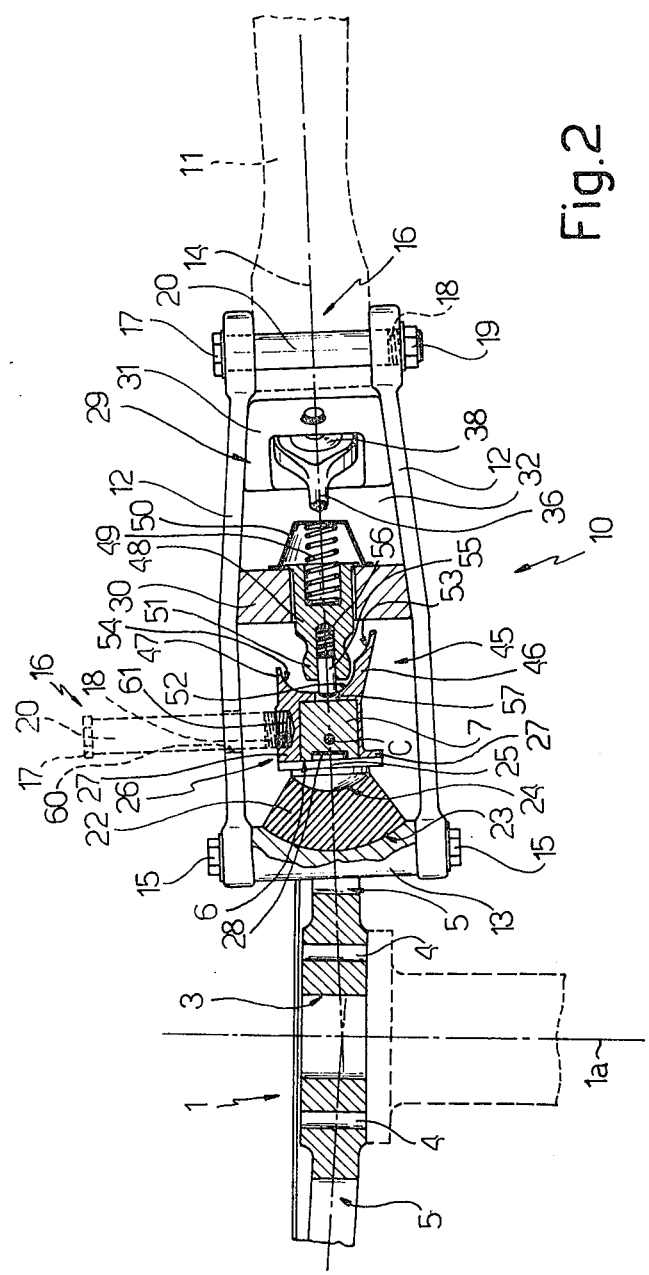
FIG. 2 is a longitudinal section through the rotor of the preceding figure, taken on a vertical plane.

With reference to the drawings, the articulated rotor according to the invention comprises substantially a hub 1 arranged for connection to the vertical rotor drive shaft (shown in dashed lines), the axis of which is indicated by 1a. This hub is in the form substantially of a flat plate with a slight upward concavity, as shown in FIG. 2. The contour of said plate is substantially polygonal, and in the base of the embodiment illustrated and described, which relates to a four bladed rotor, it comprises eight substantially flat faces 2. In the central portion of the plate there are provided a centering bore 3 and a series of bores 4 for connecting the hub to the flange of the drive shaft. The plate comprises four substantially elongated perforations 5 disposed parallel to one of the plate faces 2. A flat surface 6 of each of said perforations is substantially parallel to a corresponding face 2, in order to define therewith a plurality of bridges 7 of substantially constant square or rectangular cross-section, as can be seen in the sectional view of FIG. 2.

The rotor comprises eight yokes, each of which, indicated overall by 10, is connected to said hub in the manner described hereinafter, and is arranged to support a corresponding blade 11. As shown in FIG. 2, said yoke is of U shape and comprises a pair of substantially parallel arms 12 connected together at one end by a base element 13. Each of said arms is conveniently of plate shape and is slightly curved towards the longitudinal axis 14 of the yoke. The arms are connected to the base element in any convenient manner, for example by bolts 15. That end of the two arms 12 distant from the end connected to the base element 13 receives the root part of the corresponding blade 11. It is convenient to connect the blade to the yoke by a pair of pins 16 provided with a head 17, a threaded end portion 18 which receives a nut 19, and a central smooth portion 20 to be inserted through corresponding bores in the arms 12 and in said root.

Figure 1:
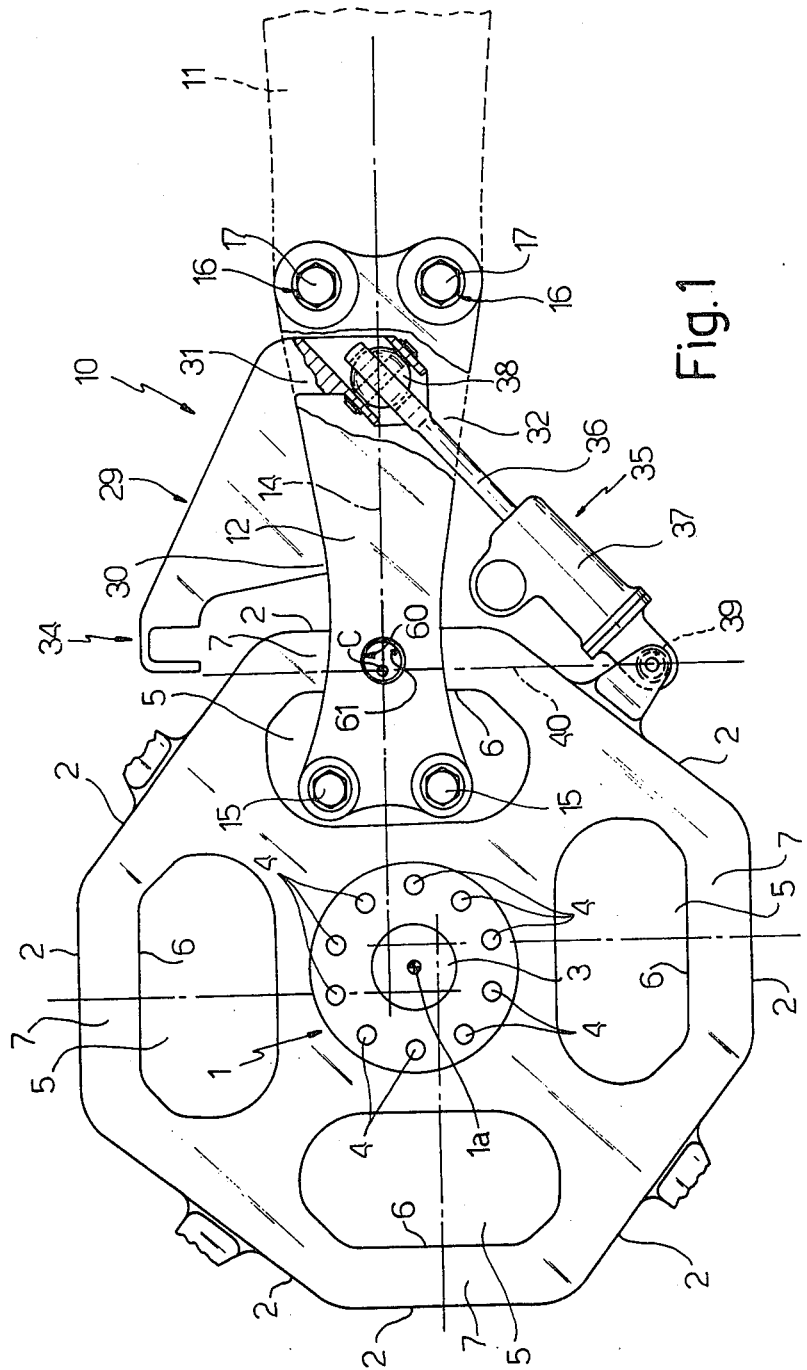
FIG. 1 is a plan view of the articulated rotor according to the invention, in which parts thereof have been omitted for greater clarity.

The base element 13 of each yoke 10 is inserted into a corresponding perforation 5 of the hub 1 such that the relative bridge 7 is disposed between the arms 12, and the longitudinal axis 14 of the yoke is orientated parallel to one of the radii of the plate of the hub 1, as can been seen in FIG. 1. The yoke is connected to the hub by an elastomer bearing 22 disposed between the base element 13 of the yoke and the corresponding bridge 7. It is bounded substantially by a pair of coaxial spherical surfaces 23 and 24, the first of which is coupled to a corresponding spherical surface of the base element 13, and the second of which is coupled to a corresponding spherical surface provided on a plate 25 fixed to the bridge 7. The position of the centre of said spherical surfaces, indicated by C in the sectional view of FIG. 2, is chosen such as to fall on the longitudinal axis 14 of the yoke 10, and within the cross-section through the relative bridge 7.

The two members to which the spherical surfaces 23 and 24 of the bearing 22 are coupled, i.e. the base element 13 and plate 25 respectively, in reality constitute together with the bearing a single mechanical element. In this respect, the connection between the bearing and base element 13 (by way of the surface 23) and between the bearing and plate 25 (by way of the surface 24) is permanent, and is made for example by vulcanising the elastomer material constituting the bearing 22 directly on to these surfaces, or alternatively by fixing said material in any other non-removable manner to the two said members.

The plate 25 is connected to the relative bridge 7 by a substantially U-shaped stirrup 26, which completely embraces the bridge and comprises connection parts 27 for connection to said plate, for example by means of screws. A pin 28 inserted into a corresponding bore in the bridge conveniently ensures that the plate 25 is positioned exactly relative to the bridge.

Each yoke 10 is connected to a corresponding operating lever 29 comprising two appendices 30 and 31 which are inserted between the pair of arms 12 of the yoke, and are locked to this in any convenient manner. In this manner, the said two appendices together with the arms 12 define a cavity 32. Said lever, which projects substantially tangentially to the relative yoke, comprises a fork 34 arranged for connection to a member (not shown) for controlling the variation of the pitch angle of the rotor blades.

A damper 35 provided substantially with a rod 36 mobile longitudinally to a casing 37 is disposed between each yoke 10 and the hub 1. The rod is connected by a ball joint 38 to the appendix 31 of the lever 29, and the casing is connected by a second ball joint 39 to the hub 1. The centre of the ball joint 38 is positioned on the longitudinal axis 14 of the yoke 10, and the centre of the ball joint 39 is positioned on an axis 40 substantially perpendicular to the preceding axis and passing through the centre C of the spherical surfaces 23 and 24 of the bearing 22.

Each yoke 10 is provided with means for limiting the amplitude of the swivel movement which the yoke can make in a vertical plane about the axis 40, in accordance with the rotational speed of the rotor. Said means comprise a stop member indicated overall by 45, consisting of parts 46, 47 projecting in the direction of the longitudinal axis 14 and provided on the bracket 26 rigid with the bridge 7. Said projecting parts are arranged to cooperate with a substantially cylindrical mobile member 48 housed in a corresponding bore in the appendix 30 of the operating lever 29, and urged towards the corresponding bridge 7 by a spiral spring 48, one end of which rests on a support element 50, its other end being inserted into a corresponding bore in said mobile member. The head 51 of said member is conveniently bounded by a spherical surface portion, and is arranged to cooperate with seats of corresponding shape 52, 53 and 54 provided in the projections 46 and 47.

According to the arrangement shown in FIG. 2, two seats 52 and 53 are provided in the projection 46, and are disposed substantially at a different distance from the longitudinal axis 14 of the yoke, whereas the projection 47 comprises only one seat 54. The distances and the relative position of said seats to the longitudinal axis 14 are chosen in accordance with the maximum angle of swivel movement which is not to be exceeded by each yoke 10 during its swivel movement about the axis 40, for predetermined rotational speeds of the rotor.

A pin 55 is slidably inserted into an axial bore in the mobile member 48, and is loaded by a corresponding spring 56 which urges it towards the relative bridge 7 through a corresponding bore 57 provided in the stirrup 26, as is shown in FIG. 2. A predetermined gap is left between the pin and bore only in the upward direction.

The upper arm 12 of each yoke 10 is provided with a through bore 60 coaxial with a corresponding dead bore 61 provided in the top of the stirrup 26. The diameters of said bores correspond substantially to the diameter of the portions 20 and 18 of one of the pins 16. These bores are arranged to receive one of said pins for the purpose which will be indicated hereinafter. The various described members of the rotor, with the exception of the bearing 22, can be constructed of any suitable metal or composite material, such as fibreglass.

As can be seen from the figures, the shape of each yoke 10 and, in particular, of the operating lever 29 are such as to form an assembly of aerodynamic shape which has therefore low resistance to rotation. In this respect, those parts of the yoke 10 which are exposed to the air flow and which lie in planes perpendicular to the tangential direction of rotation have an extremely small area. In addition, the lever 29 can be bounded by surfaces which are joined to each other in a suitable manner.

The behaviour of the articulated rotor of the present invention when in operation is as follows.

The normal flapping swivel movements of each blade 11 in vertical planes take place about axes passing through the centre C and contained substantially in a horizontal plane. In particular, they take place about the axis 40 whenever the lead-lag angle (i.e. the angle through which the longitudinal axis 14 of each yoke rotates about a vertical axis passing through C) is zero. These swivel movements are in fact allowed by the kinematic connection between each yoke 10 and the relative bridge 7, formed by the bearing 22. As the centre of the spherical surfaces 23, 24 which externally bound the bearing is located at the point C, any swivel movements of the yoke itself in vertical planes can only take place about horizontal axes passing through said point.

The maximum width of the upward and downward flapping angle is uncontrolled, but is limited by the said means with which the rotor according to the invention is provided. In this respect, when the rotational speed of the hub 1 is fairly low and in any case below a predetermined value, the centrifugal force acting on the mobile member 48 and on the pin 55 is less than the resilient reaction exerted by the corresponding springs 49 and 56, because of which they remain in their initial position, the former towards the left in FIG. 2, and the latter inside the corresponding bore 57 in the stirrup 26. As there is a predetermined slack between the bore and pin only in an upward direction, any swivelling of any yoke downwards is prevented for rotational speeds less than the said predetermined value, whereas upward swivelling about a horizontal axis passing through the centre C is halted when the outer surface of the pin 55 comes into contact with the surface of the corresponding bore 57. In contrast, when the rotational speed of the rotor exceeds said predetermined value, the centrifugal force acting on the pin 55 is sufficient to overcome the resilient reaction of the corresponding spring 56, to displace it towards the right in FIG. 2 into the relative bore in the mobile member 48. In this manner, the pin 55 is no longer able to halt the swivelling of the yoke 10, and the limitation to the maximum angular excursion in this case takes place when the spherical surface of the head 51 of the mobile member 48 comes into a state of cooperation with the corresponding lower seat 52 and upper seat 54 of the projections 46 and 47. Finally, for still higher rotational speeds of the rotor, there is a further displacement of the mobile member 48 towards the right in FIG. 1, because of the higher centrifugal force acting thereon, with the consequence that the maximum angular excursion permitted during the flapping swivel motion increases. In this case, this new limitation is obtained by contact between the head part 51 and the seats 53 and 54 of the projections 46 and 47.

Although it is possible to size the mobile member 48, pin 55 and relative springs 49 and 56 in any manner, and to position the seats 52, 53 and 54 at any distance from the longitudinal axis 14 to obtain required combinations of rotational speed and maximum flapping angles for each of said speeds, it has been found convenient to effect the following combination. For rotational speeds less than 25% of the maximum rotational speed of the rotor, the maximum allowable flapping angle has been chosen between 0° and +2°, while for rotational speeds between 25 and 85% of the maximum, the allowable flapping angle has been chosen between −2° and +25°. Finally, for still higher speeds a limit has been set for downward flapping swivel movements only, of −6°.

It is therefore apparent that with the described rotor structure according to the invention, flapping swivel movements are attained which are very exact from the geometrical-kinematic viewpoint, with precise control of the maximum allowable swivel movements. In this respect, the ideal conditions from the geometrical-kinematic viewpoint are exactly satisfied, as the only kinematic connection between each yoke and the relative hub is by way of the elastomer bearing 22 which, because of its geometrical structure, is able to allow the yoke 10 to swivel in vertical planes only about axes passing through the centre C and contained in a horizontal plane. On the other hand, the means for limiting the maximum allowable flapping swivel movements in accordance with the rotor speed neither interfere with nor have any influence on the kinematic relationship between the yoke and hub, until the various described parts of said means come into contact with each other.

The normal variation in the angular position of the blades in a horizontal plane about a vertical axis (lead-lag angle) is also well defined. This variation in position occurs with a rotation about the vertical axis again passing through the centre C. This derives from the type of connection between the yoke and bridge 7 made by way of the bearing 22, and from the shape of the bearing itself. On the other hand, variations in the lead-lag angle have no influence on the variations in the flapping angle, because the geometrical-kinematic conditions which enable the yoke to swivel under exact conditions about the axes contained in a horizontal plane and passing through the point C remain completely unchanged for any lead-lag angle. This also derives from the choice of the positions for the centre of the hinges 38 and 39, on the axes 14 and 40 respectively. In this respect, this configuration prevents the damper 35 from giving rise to further constraints beyond that constituted by the bearing 22, and thus influencing the parity of the examined movements. Finally, normal rotation of the blade about its longitudinal axis for varying the angle of pitch is also allowed and is well defined. This is in fact obtained by the rotation of each yoke 10 about its longitudinal axis 14, which is allowed by the relative bearing 22.

When the rotor is at rest and the relative blades 11 are to be folded, it is necessary only to disconnect one of the pins 16 which fix each blade to the arms 12 of the relative yoke 10. The blade can then rotate about the axis of the other pin, which acts as a hinge for said rotation. The pin which has been removed can be inserted into the bore 60 in the upper arm 12, so as to house its lower end in the dead bore 61 provided in the stirrup 26. In this manner, because of the constraint created between the yoke and hub by virtue of the insertion of the pin 16 which connects together these two elements, any movement of the yoke relative to the hub is prevented, as is necessary when the rotor is in its rest configuration with the blades folded back.

It is apparent that modifications can be made to the described embodiment of the present invention both in the shape and arrangement of the various parts without leaving the scope of the inventive idea.

What we claim is:

1. A multi-blade articulated rotor for helicopters, comprising:
    a hub connected to a shaft rotatable substantially about a vertical axis, the hub being in the form of a plate comprising a plurality of perforations, each of which defines a bridge of material of said plate between a part of the edge of said perforation and a part of the edge of said plate;
    a plurality of yokes, each of which is subtantially of U shape and comprises a pair of substantially parallel arms and a base element which connects together one end of said arms, the other end of the arms being connected to one of said perforations in the hub in such a manner that the corresponding bridge is disposed between said yoke arms, and the longitudinal axis of the yoke is oriented in a radial direction to the hub;
    a plurality of elastomer bearings, each of which is disposed between said base element of a yoke and the corresponding hub bridge, and is bounded by a pair of coaxial spherical surfaces whose center falls within the section of the corresponding bridge;
    a plurality of operating levers, each of which is arranged to control the variation of the angle of pitch of a corresponding blade of the rotor and has an end inserted between said arms of the relative yoke; and a plurality of dampers, each of which has a first end hinged, by means of a first ball joint, to the said end of the operating lever, and a second end hinged, by means of a second ball joint, to a projection of said hub, the centers of said first and second ball joints lying, respectively, on said longitudinal axis of the yoke and on a second axis substantially horizontal and perpendicular to said longitudinal axis and passing through said center of said spherical surfaces of the bearing of elastomer material.

2. An articulated rotor as claimed in claim 1 wherein said rotor comprises means for limiting the amplitude of the swivel movement which each of said yokes can make substantially in a vertical plane, each of which means comprises a stop member which is rigid with said bridge and is provided with a substantially radial bore and with at least a first and a second seat arranged at different distances from the axis of said bore, a first member mobile in a bore of said end of said operating lever, arranged to cooperate with one of said seats and loaded by a spring, a second member mobile within a bore of said first mobile member, loaded by a spring and arranged to move within said bore of said stop member, said mobile members assuming, when the speed of the rotor is lower than a first predetermined value, a first rest configuration in which they are in the position of end of their travel towards said stop member and the said second mobile member is inserted into said bore of said stop member, said mobile members assuming, when the speed of the rotor is comprised between said first predetermined value and a second predetermined value, a second configuration in which, under the effect of the centrifugal force, said second mobile member has moved away from said rest position and has come out from said bore of said stop member in order to allow said first mobile member to limit, by cooperating with the first of said seats, said amplitude of the swivel movement, and said mobile members assuming, when the speed of the rotor is higher than said second predetermined value, a third configuration in which said second mobile member also, under the effect of the centrifugal force, is moved away from said rest position in order to allow said first mobile member to limit, by cooperating with the second of said sheets, the said swivel movement.

* * * * *